United States Patent
Ward et al.

(10) Patent No.: US 7,380,644 B2
(45) Date of Patent: Jun. 3, 2008

(54) DISC SLIDING MECHANISM

(75) Inventors: Andrew John Ward, Cottesbrooke (GB); Franz Helmut Holl, Rheinland-Rfalz (DE); Martin Pors Taylor, Torfaen (GB); Denis John McCann, Rochester Hills, MI (US); Stefano Cattaneo, Magenta (IT); Mark Anthony Norman, Mid Glamorgan (GB); Jonathon Leslie Christopher Jackson, Ross-on-Wye (GB); Carl Edward Heinlein, Newport (GB)

(73) Assignee: Meritor Heavy Vehicle Braking Systems (UK) Ltd., Gwent (GB)

( * ) Notice: Subject to any disclaimer, the term of this patent is extended or adjusted under 35 U.S.C. 154(b) by 83 days.

(21) Appl. No.: 11/016,362

(22) Filed: Dec. 17, 2004

(65) Prior Publication Data

US 2005/0199452 A1 Sep. 15, 2005

(30) Foreign Application Priority Data

Dec. 18, 2003 (GB) ................................. 0329425.3

(51) Int. Cl.
*F16D 65/54* (2006.01)

(52) U.S. Cl. .................. 188/71.8; 188/196 P; 188/18 A (58) Field of Classification Search ............... 188/71.1, 188/71.5, 71.7, 71.8, 196 A, 196 C, 196 P, 188/1.11 R, 1.11 W, 1.11 E, 1.11 L, 18 A; 192/70.25, 111 A See application file for complete search history.

(56) References Cited

U.S. PATENT DOCUMENTS 1,927,358 A * 9/1933 Breguet ..................... 188/71.4

| | | | |
|---|---|---|---|
| 3,762,522 A | 10/1973 | Kirschling | |
| 3,788,429 A | 1/1974 | Brooks et al. | |
| 3,858,700 A * | 1/1975 | Kirschling | 188/71.8 |
| 4,382,491 A | 5/1983 | Chun | |
| 4,540,067 A | 9/1985 | Meynier | |
| 2004/0055834 A1 | 3/2004 | Thorpe | |

FOREIGN PATENT DOCUMENTS

| EP | 0 478 947 | 8/1991 |
|---|---|---|
| FR | 2 425 581 | 5/1979 |
| GB | 332670 | 7/1930 |
| JP | 55112428 | 8/1980 |
| JP | 58203240 A * | 11/1983 |

OTHER PUBLICATIONS

European Search Report dated Apr. 6, 2005.
Great Britain Search Report dated Jun. 16, 2004.

* cited by examiner

*Primary Examiner*—Thomas J Williams
(74) *Attorney, Agent, or Firm*—Carlson, Gaskey & Olds (57) ABSTRACT

A brake system includes a brake disc having a first disc face and a second disc face on a first side and a second side, respectively, of the brake disc. The brake disc is mounted rotatably fast with but longitudinally slidable on a rotatable shaft. The brake disc is clampable between a first friction surface of a fixed brake pad positioned on the first side of the brake disc and a second friction surface of a moveable brake pad positioned on the second side of the brake disc. The system further includes a disc positioner operable to define a running clearance between the first disc face and the first friction surface. The disc positioner is adjustable to maintain the running clearance as the fixed brake pad wears. A biasing member located on the second side of the brake disc maintains contact between the disc positioner and first disc face of the brake disc.

4 Claims, 11 Drawing Sheets

DISC SLIDING MECHANISM

REFERENCE TO RELATED APPLICATIONS

This application claims priority to Great Britain patent application GB 0329425.3 filed Dec. 18, 2003.

BACKGROUND OF THE INVENTION

This invention relates generally to brake systems, and more specifically to devices for positioning discs within brake systems.

Most conventional disc brake systems have a fixed brake disc and a caliper configuration with a piston and a cylinder. The caliper includes a sliding bridge which slides on pins and a pair of brake pads. An outer brake pad is on an outboard end (wheel side) of the bridge, and an inner brake pad is on an inboard end (chassis side) of the bridge. The fixed brake disc is located between the outer brake pad and the inner brake pad and is fixed rotatably and axially fast with a shaft connected to a wheel.

When the brake is operated, the piston engages and slides the inner brake pad along the bridge into contact with an inside face of the fixed brake disc. A reaction force causes the slidable caliper to slide on the pins and force the outer brake pad into contact with an outer side of the fixed brake disc. Equal forces are applied to the brake disc from the outer pad and the inner pad. Frictional engagement of the brake disc with the brake pads causes deceleration of the clamped disc and therefore decelerates the connected wheel and consequently the vehicle. When the brake is released, the brake pads return to a position where there is a running clearance between the brake pads and the fixed brake disc.

Therefore, the present invention provides an improved braking system.

SUMMARY OF THE INVENTION

The present invention provides a brake system including a brake disc having a first disc face and a second disc face on a respective first side and a second side of the brake disc. The brake disc is mounted rotatably fast with but longitudinally slidable on a rotatable shaft and is clampable between a first friction surface of a fixed brake pad positioned on the first side and a second friction surface of a moveable brake pad positioned on the second side. The system further includes a disc positioner operable to define a running clearance between the first disc face and the first friction surface. The disc positioner is adjustable to maintain the running clearance as the fixed brake pad wears.

BRIEF DESCRIPTION OF DRAWINGS

Embodiments of the invention will now be described, by way of example only, with reference to the accompanying drawings in which.

DETAILED DESCRIPTION OF THE PREFERRED EMBODIMENTS

Figure 1:
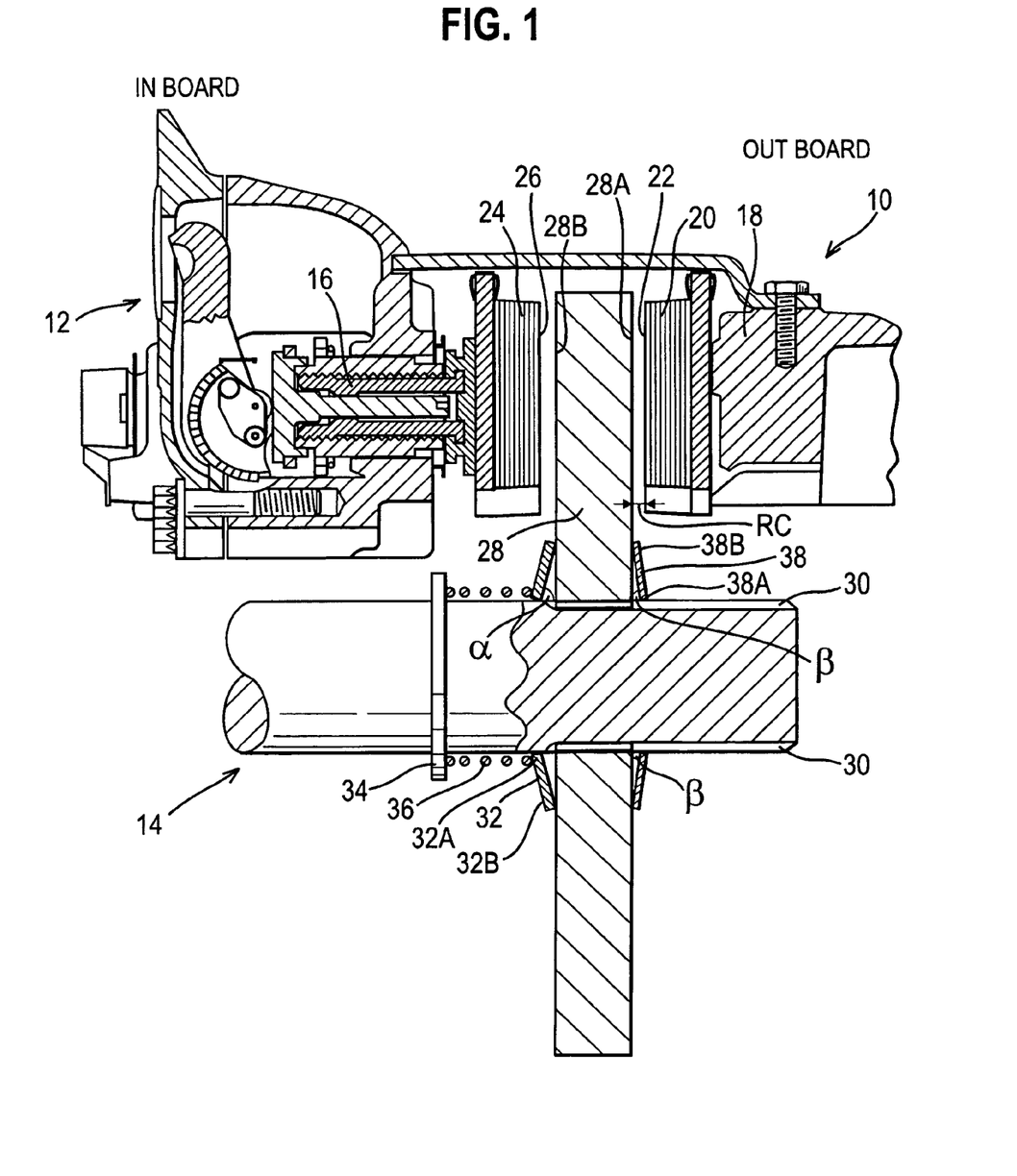
FIG. 1 is a schematic view of a slidable brake disc system according to the invention in a brake off position.

Referring to FIG. 1, there is shown a brake disc system 10 in accordance with the invention including a caliper 12 fixed relative to a suspension component of a vehicle (not shown) and a shaft 14 connected to the wheel (not shown) of the vehicle. The caliper 12 includes a piston 16 and an oppositely facing end 18. The caliper 12 also includes two brake pads: a fixed brake pad 20 connected to the end 18 and a moveable brake pad 24 connected to the piston 16. The fixed brake pad 20 and the moveable brake pad 24 have a first friction surface 22 and a second friction surface 26, respectively.

A brake disc 28 mounted about the shaft 14 is located between the two brake pads 20 and 24. The brake disc 28 defines an outboard side (the side to the right of the brake disc 28 in FIG. 1) and an inboard side (the side to the left of the brake disc 28 in FIG. 1).

The brake disc 28 has a first face 28A on the outboard side which is substantially parallel to the first friction surface 22 and a second face 28B which is substantially parallel to the second friction surface 26 of the moveable brake pad 24.

The brake disc 28 is rotatably fast with but longitudinally slidable with the shaft 14. The brake disc 28 slides along splines 30 on the surface of the shaft 14.

On the inboard side of the brake disc 28, there is an inboard spragging device 32 in contact with the second face 28B of the brake disc 28, a fixed sleeve 34 which is fixed longitudinally with respect to the shaft 14, and a biasing spring 36 disposed between the fixed sleeve 34 and the inboard spragging device 32.

The inboard spragging device 32 is an annular plate including an inner rim 32A and an outer rim 32B. The inner rim 32A has substantially the same circumference as the shaft 14 and frictionally engages the shaft 14 so that the inboard spragging device 32 will only move along the shaft 14 if a force greater than a predetermined force has been applied. The outer rim 32B contacts the second face 28B of the brake disc 28.

The inboard spragging device 32 is inclined at an angle α relative to the shaft 14 such that the inner rim 32A is located at a distance in the inboard direction from the brake disc 28. The inboard spragging device 32 is resiliently biased against the brake disc 28, and a force needs to be applied to move the outer rim 32B in the inboard direction and to increase the angle of inclination α relative to the shaft 14.

The force required to slide the inboard spragging device 32 along the shaft 14 is different in the two axial directions. When a force is applied on the inboard spragging device 32 to push it in the inboard direction, a moment is created between the outer rim 32B and the inner rim 32A, increasing the angle α between the inboard spragging device 32 and the shaft 14, and thereby forcing the inner rim 32A into closer contact with the shaft 14. Consequently, a large force is required to force the inboard spragging device 32 in the inboard direction. The brake disc 28 moves to the right when shown in FIG. 1 as a result of wear of the fixed brake pad 20. The angle α will then decrease, thereby reducing the friction between the inboard spragging device 32 and the shaft 14 and allowing the biasing spring 36 (see below) to slide the inboard spragging device 32 along the shaft 14.

The biasing spring 36 is disposed between the fixed sleeve 34 and the inboard spragging device 32 and is a helical spring that surrounds the shaft 14. The biasing spring 36 maintains the inboard spragging device 32 in contact with the second face 28B of the brake disc 28 by forcing the inboard spragging device 32 in the outboard direction, which is easier to push. The biasing spring 36 is not strong enough to force the inner rim 32A any further in the outboard direction once the outer rim 32B is in contact with the brake disc 28, which would require the angle α to increase against the resilient bias of the inboard spragging device 32. Because the inboard spragging device 32 requires a large force to move in the inboard direction and because the inboard spragging device 32 is maintained in contact with the brake disc 28, the inboard spragging device 32 reduces movement of the brake disc 28 axially along the shaft 14 in the inboard direction. As a benefit, any problems with dragging and therefore overheating of the brakes are reduced.

An outboard spragging device 38 is located on the outboard side of the brake disc 28. The outboard spragging device 38 is constructed similarly to the inboard spragging device 32 and is also an annular plate including an inner rim 38A and an outer rim 38B.

The inner rim 38A has a circumference that is similar to the circumference of the outer surface of shaft 14 and is frictionally engaged with it, while the outer rim 38B is in contact with the first face 28A of the brake disc 28.

The outboard spragging device 38 is inclined at an angle β relative to the shaft 14, where the angle β is greater than the angle α. The outboard spragging device 38 is also considerably thinner than the inboard spragging device 32 and is preferably made of weaker material. Due to the weaker and less inclined nature of the outboard spragging device 38, the outer rim 38B can be pushed more easily in the outboard direction to increase the angle β.

The inner rim 38A of the outboard spragging device 38 is substantially aligned with the first friction surface 22 of the fixed brake pad 20. The brake disc 28 contacts the outer rim 38B. Therefore, the inclined nature of the outboard spragging device 38 defines a running clearance RC between the first face 28A of the brake disc 28 and the first friction surface 22 of the fixed brake pad 20 as the axial distance between the inner rim 32A and the outer rim 32B.

The strength of the outboard spragging device 38 is reduced relative to the strength of the inboard spragging device 32, but the outboard spragging device 38 is still resiliently biased against the brake disc 28 and reduces movement of the slidable brake disc 28 in the outboard direction when in a brake off position. Consequently, the running clearance RC is desirably maintained at the same distance while the brake is off.

Figure 2:
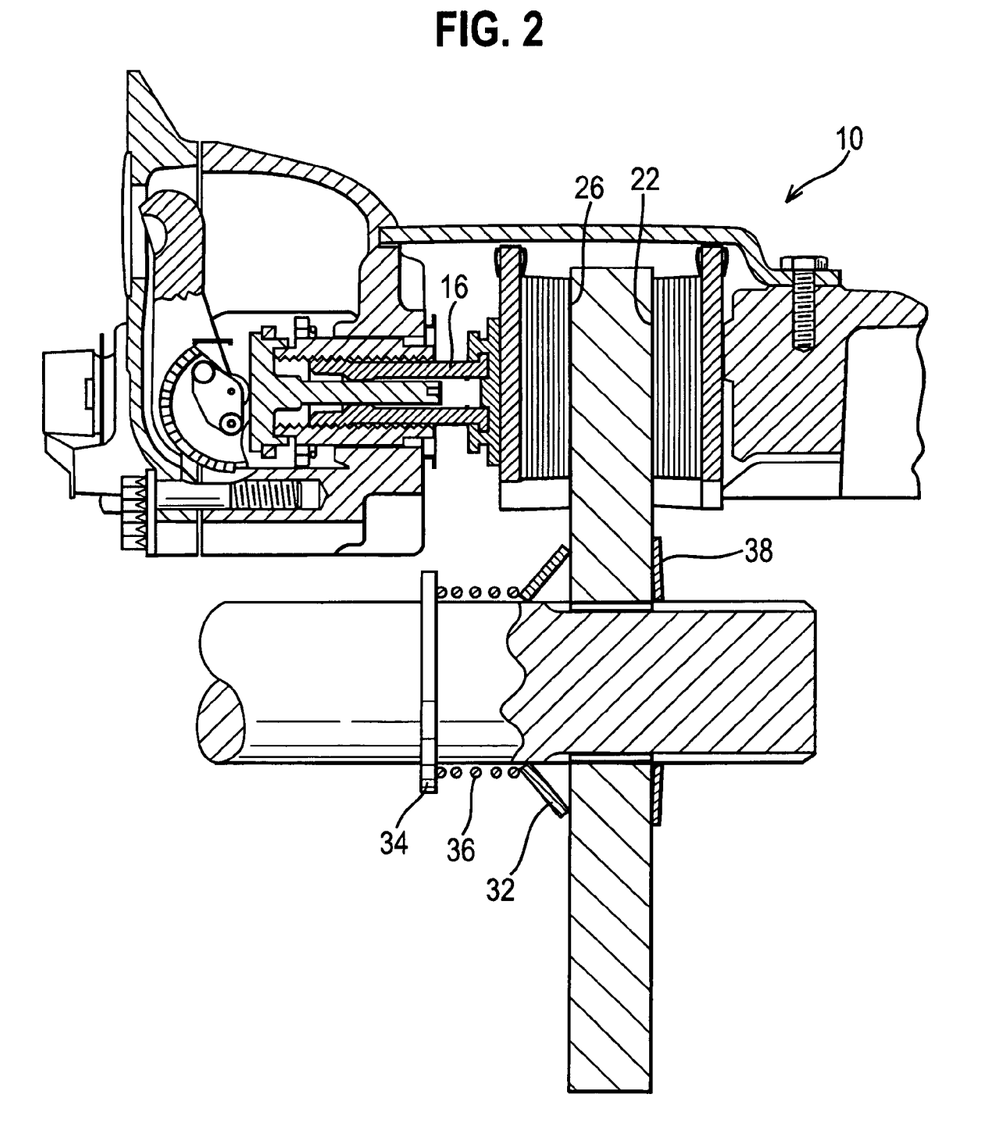
FIG. 2 is a schematic view of the brake disc system of FIG. 1 with a brake applied.

In FIG. 2, the brake disc system 10 is shown with the brake applied. The piston 16 has been moved significantly in the outboard direction so that the moveable brake pad 24 contacts the brake disc 28. In this position, the brake disc 28 is clamped with great force between the first friction surface 22 of the fixed brake pad 20 and the second friction surface 26 of the moveable brake pad 24.

The running clearance RC between the brake disc 28 and the first friction surface 22 of the fixed brake pad 20 has been reduced to zero since the brake force of the piston 16 is great enough to overcome the resilience of the outboard spragging device 38 such that the outer rim 38B is pushed back to be substantially aligned with both the inner rim 38A and the first friction surface 22 of the fixed brake pad 20. The inner rim 38A of the outboard spragging device 38 is in the same axial position as in FIG. 1 since a greater force is required to move the outboard spragging device 38 in the outboard direction than is required to increase the angle β. Consequently, the outboard spragging device 38 is substantially vertical and parallel with the brake disc 28.

The outer rim 32B of the inboard spragging device 32 still contacts the second face 28B of the brake disc 28, and the inboard spragging device 32 is inclined at angle less than the angle α since the inner rim 38A has not yet, at this stage, moved axially relative to the shaft 14.

When the brake is released, the piston 16 and the moveable brake pad 24 retract back to the positions shown in FIG. 1. The force compressing the outboard spragging device 38 against its resilient bias is removed, and the outboard spragging device 38 returns to its previous inclined position shown in FIG. 1 with the outer rim 38B forcing the brake disc 28 to the position of FIG. 1 and restoring the running clearance RC.

The force produced by the outboard spragging device 38 returning from the substantially upright position in FIG. 2 to the inclined position of FIG. 1 is sufficient to force the inboard spragging device 32 to the position depicted in FIG. 1. Thus, the inboard spragging device 32 biases the brake disc 28 to the right, whereas the outboard spragging device 38 biases the brake disc 28 to the left. Therefore, the brake disc 28 will move to a position where the bias forces of the inboard spragging device 32 and the outboard spragging device 38 are balanced.

Over time, the material of brake pads 20 and 24 will wear. When the fixed brake pad 20 wears, the running clearance RC between the first face 28A and the first friction surface 22 is temporarily increased. However, when the brake is applied, the brake disc 28 is pushed beyond the position shown in FIG. 2 to the new retracted position of the first friction surface 22 of the worn fixed brake pad 20. With the brake disc 28 is forced beyond this position, the already upright outboard spragging device 38 is slid axially from the location shown in FIG. 2 along the shaft 14 in an outboard direction so that the outboard spragging device 38 is substantially aligned with a new more outboard position of the first friction surface 22. The brake force is easily large enough to move the outboard spragging device 38 in the outboard direction. As the brake disc 28 moves away from the inboard spragging device 32, the angle α decreases to a point where the biasing spring 36 is capable of pushing the inboard spragging device 32 along the shaft 14. The biasing spring 36 will continue to push the inboard spragging device 32 along the shaft 14 until the outer rim 32B contacts the brake disc 28.

Figure 3:
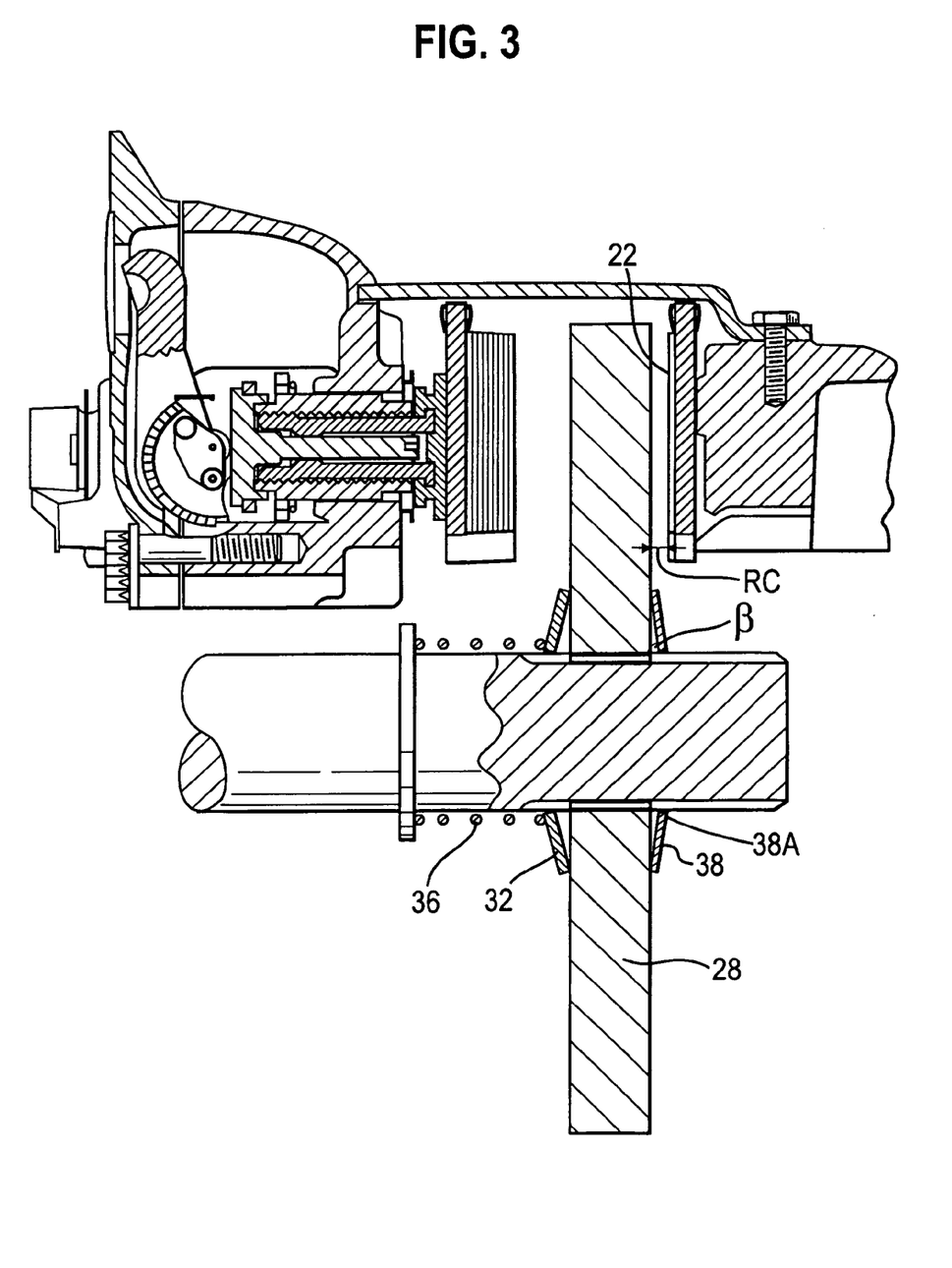
FIG. 3 is a schematic view of the brake disc system of FIG. 1 in the brake off position with a large amount of pad wear of an outboard fixed brake pad.

When the brake is released, the moveable brake pad 24 is returned and the brake disc system 10 moves to position shown in FIG. 3.

Thus, in FIG. 3, the inner rim 38A of the outboard spragging device 38 is in a position substantially aligned with the new position of the first friction surface 22. The outer rim 38B of the outboard spragging device 38 has moved back relative to the inner rim 38A to restore the original inclined angle β relative to the shaft 14. Consequently, the brake disc 28 has been pushed back in the inboard direction so that the running clearance RC is identical to the previous running clearance RC with an unworn brake pad shown in FIG. 1.

Referring to FIG. 3, the inboard spragging device 32 has maintained contact with the second face 28B of the brake disc 28, with the biasing spring 36 having uncompressed significantly from the position shown in FIG. 1 to accommodate the further outboard location of the brake disc 28 relative to the inboard spragging device 32 in FIG. 1.

Figure 4:
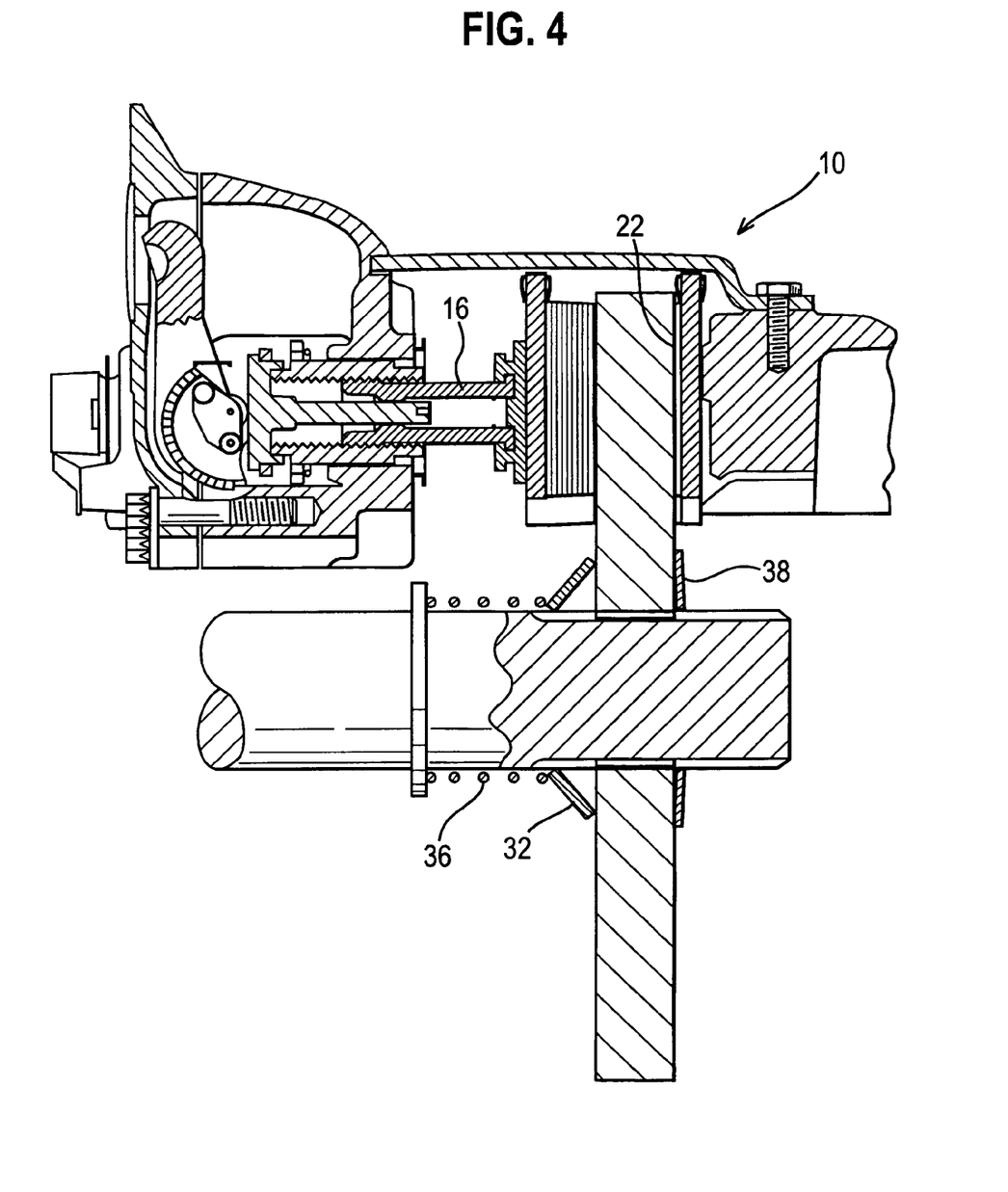
FIG. 4 is a schematic view of the brake disc system of FIG. 3 with the brake applied after significant wear of the outward fixed brake pad.

Thus, in FIG. 4, the brake disc system 10 is shown with the inner fixed brake pad 20 in the same worn state as in FIG. 3, but with the brake disc system 10 depicted with the brake applied and the brake disc 28 clamped between the brake pads 20 and 24. In this configuration, the outboard spragging device 38 has been compressed to a substantially upright position substantially aligned with the first friction surface 22, as in the configuration depicted in FIG. 2. The inboard spragging device 32 remains in contact with the second face 28B of the brake disc 28.

As can be seen with reference to FIGS. 1 to 4, the running clearance RC between the brake disc 28 and the first friction surface 22 of the fixed brake pad 20 is substantially the same distance whenever the brake is released. The outboard spragging device 38 ensures that the brake disc 28 is positively restored to the running clearance RC from the first friction surface 22, thereby avoiding the need for vibrations and knocks to separate the brake disc 28 from the fixed brake pad 20, reducing unnecessary heat and wear.

When the brake is not applied and the brake pads 20 and 24 are unworn, the brake disc 28 sits at an equilibrium position wherein the inboard spragging device 32 sits at an angle α relative to the shaft 14, and the outboard spragging device 38 sits at an angle β relative to the shaft 14.

Upon application of the brake, the inboard moveable brake pad 24 moves the brake disc 28 to the right such that it engages the outboard fixed brake pad 20. This results in the angle β increasing and the angle α decreasing. However, the inner rims 32A and 38A of the inboard spragging device 32 and the outboard spragging device 38, respectively, do not move axially relative to the shaft 14. Upon release of the brake, the brake disc 28 returns to the "brake off" position.

However, when the fixed brake pads 20 wears significantly, application of the brake will cause the moveable brake pad 24 to force the brake disc 28 along the shaft 14. The angle β will increase to substantially 90 degrees, whereupon the outboard spragging device 38 will also start to slide along the shaft 14. As this occurs, the angle α will decrease such that the biasing spring 36 is able to slide the inboard spragging device 32 along the shaft 14, thereby maintaining the outer rim 32B in engagement with the brake disc 28. Upon release of the brake, the brake disc 28 returns to an equilibrium position defined by the inboard spragging device 32 and the outboard spragging device 38, and the outboard spragging device 38 is angled at the angle β relative to the shaft 14, and the inboard spring device 32 is angled at the angle α relative to the shaft 14.

Figure 5:
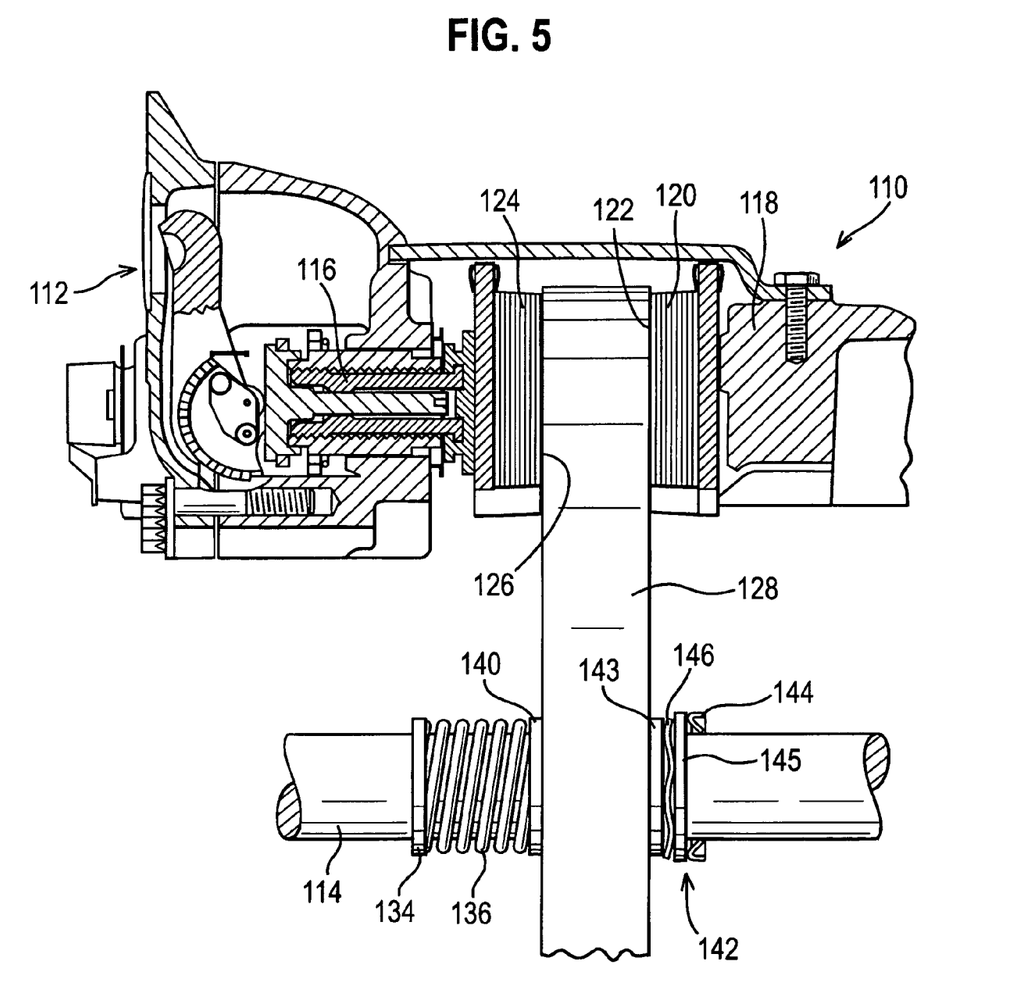
FIG. 5 is a schematic view of a second embodiment of the brake disc system according to the invention shown with the brake applied.

A second embodiment of brake disc system of 110 is shown in FIG. 5, with the brake applied. Substantially identical components which have substantially the same function as components in the brake disc system 10 are given corresponding reference numbers, except with a prefix of 1.

In FIG. 5, a brake disc 128 is shown in a brake position and is clamped between brake pads 120 and 124. The brake disc system 110 does not have an inner spragging device and instead includes a moveable sleeve 140 in contact with a first face 128A of the brake disc 128. A biasing spring 136 is disposed between the movable sleeve 140 and a fixed sleeve 134. When in a brake off position (not shown), movement of the brake disc 128 in the inboard direction is reduced by the biasing spring 136.

A positioning device (disc positioner) 142 is located on the outboard side of the brake disc 128 instead of an outboard spragging device. The positioning device 142 is slidable on a shaft 114 and contacts a first face 128A of the brake disc 128.

The positioning device 142 includes a first flange 143, a second flange 145, a tolerance ring 144 and a spring 146. The first flange 143 contacts the brake disc 128 and is separated from the second flange 145 by the spring 146. The tolerance ring 144 is adjacent to the second flange 145 on the outboard side.

In FIG. 5, the spring 146 is compressed between the first flange 143 and the second flange 145, and the first flange is substantially aligned with a first surface 122 of the brake pad 120. When the brake is released and the moveable brake pad 124 is retracted, the clamping force on the brake disc 128 is removed and the spring 146 uncompresses, forcing the first flange 143 and the brake disc 128 in the inboard direction. This creates a running clearance RC between the brake disc 128 and the first surface 122 of brake pad 120, as with the brake disc system 10. The brake disc 128 will achieve an equilibrium position wherein the forces applied by the biasing spring 136 to the right balance the forces applied by the spring 146 to the left.

When in the brake off position, movement of the brake disc 128 in the outboard direction is mitigated by the resilience of the spring 146.

The tolerance ring 144 is frictionally engaged with the shaft 114 and will only move in the outboard direction when a force above a predetermined amount is applied. Disc run-out and vibrations which cause movement of the brake disc 128 when in the brake off position are not sufficient to move the axial position of the shaft 114. If there is any movement of the brake disc 128 in the outboard direction without the brake being applied, it will be absorbed by the spring 146.

When the fixed brake pad 120 wears and the first surface 122 is located further in the outboard direction, the first flange 143 is no longer aligned with the first surface 122. Consequently, when the brake is applied and the brake disc 128 is pushed in the outboard direction by the brake pad 124, the brake disc 128 contacts the first flange 143 before contacting the brake pad 120. The force of the brake asserted through the piston 116 is greater than the force required to move the tolerance ring 144 along the shaft 114. When the brake disc 128 is forced onto the first flange 143, the spring 146 is compressed and the positioning device 142 is slid along the shaft 114 until the brake disc 128 contacts the first surface 122. At this point, the first flange 143 is substantially aligned with the first surface 122 of the worn outboard fixed brake pad 120.

Figure 6:
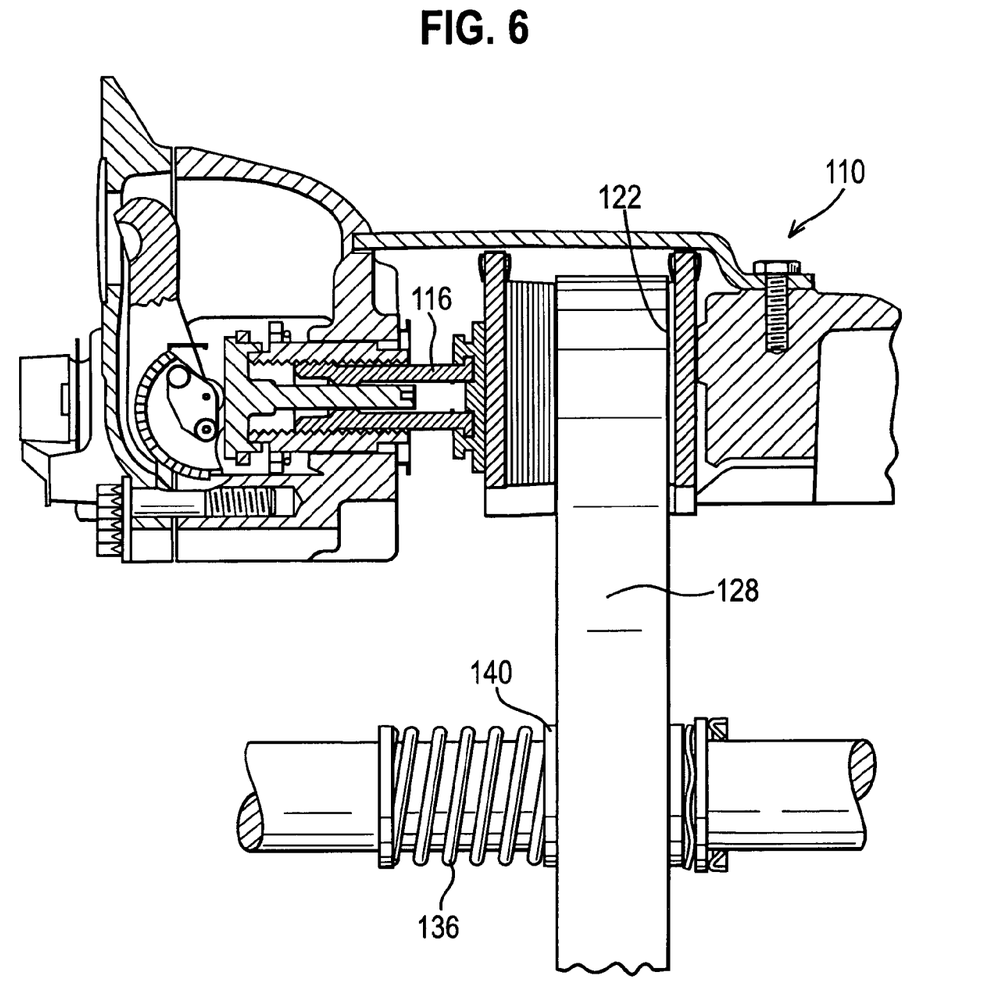
FIG. 6 is a schematic view of the brake disc system of FIG. 5 also with the brake applied, but with a significant large amount of pad wear of the outboard fixed brake pad.

The brake disc system 110 with the brake applied after substantial pad wear of the brake pad 120 is shown in FIG. 6. As shown, the positioning device 142 has been moved axially in the outboard direction from the position depicted in FIG. 5 so that first flange 143 is aligned with the new axial location of the first surface 122. The biasing spring 136 is expanded from the position in FIG. 5 such that the moveable sleeve 140 is maintained in contact with the second face 128B of the brake disc 128.

When the brake is released and the piston 116 and the brake pad 124 are retracted, the spring 146 uncompresses, again forcing the first flange 143 and the brake disc 128 in the inboard direction. The running clearance RC is thereby restored. The spring 146 is a relatively high rate spring having a relatively short uncompressed length. This can be contrasted with the biasing spring 136 which is a relatively low rate spring having a relatively long uncompressed length.

In the brake off position, the positioning device 142 and the biasing spring 136 reduce movement of the brake disc 128 in the outboard and inboard directions, respectively, in the same manner as before the brake pad 120 was worn.

Figure 7:
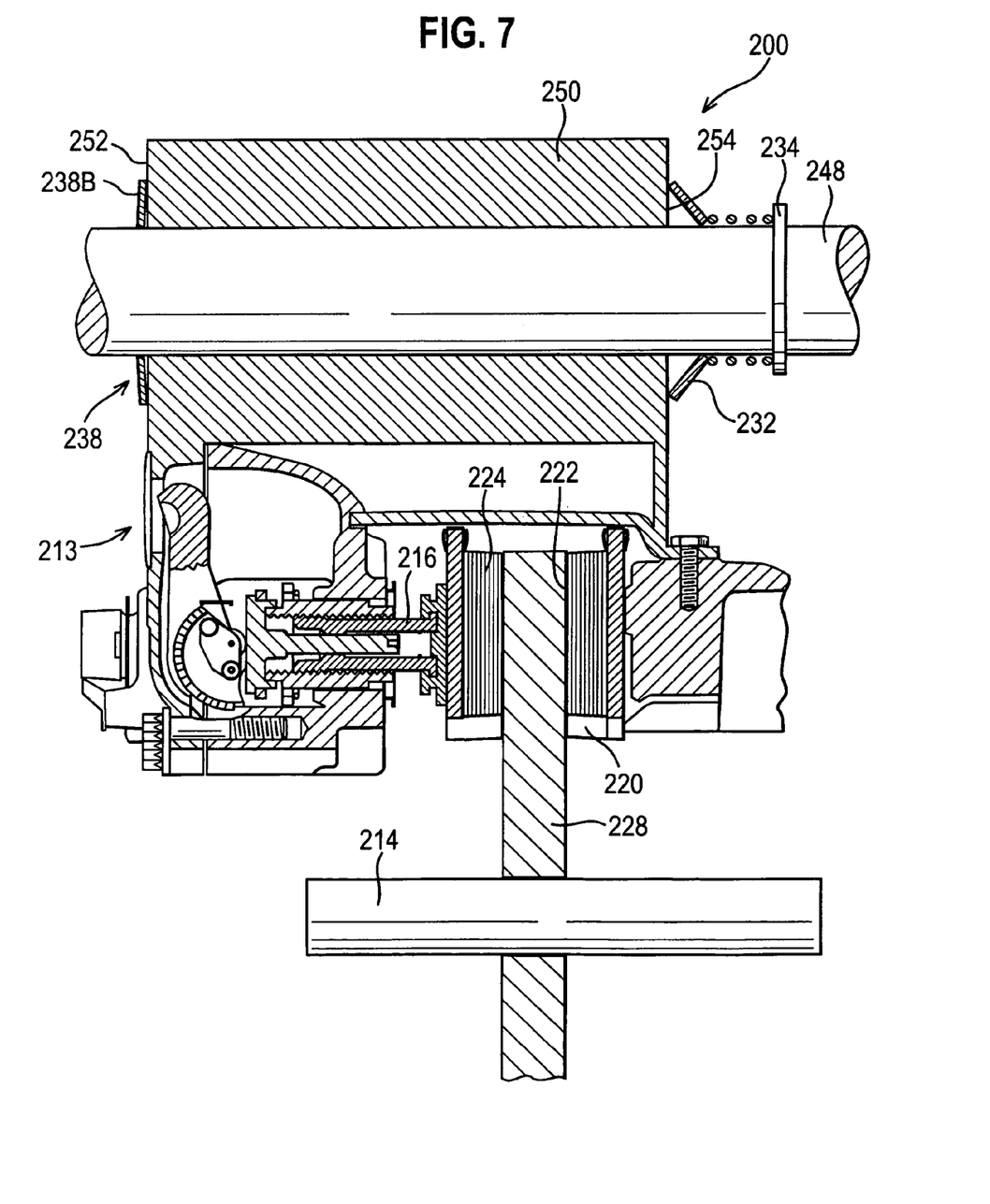
FIG. 7 is a schematic view of a fixed brake disc and sliding caliper brake system according to the invention depicted with a brake applied.

A further embodiment of brake disc system 210 according to the invention is depicted in FIG. 7. Substantially identical components with substantially the same function as components in the brake disc system 10 are given the same reference number, but with a prefix of 2.

The brake disc system 210 is depicted in FIG. 7 in the brake position with little or no brake pad wear having occurred.

The brake disc system 210 has a slidable caliper 213 substantially similar to the fixed caliper 212 shown in FIG. 1, except that rather than being fixed to the suspension component, it is slidable along a pin 248 (mounted on a suspension component) via a bushing element 250. In this case, a brake disc 228 is fixed relative to a shaft 214.

As shown in FIG. 7, the brake disc system 210 includes no disc positioning elements on the shaft 214, but instead includes spragging devices located on the pin 248.

The brake disc system 210 includes a first spragging device 238 substantially identical to the outboard spragging device 38, but located on the inboard side of the slidable caliper 213. The outer rim 238B of the first spragging device 238 contacts the inboard face 252 of the bushing element 250. In the brake position depicted in FIG. 7, the first spragging device 238 is in a compressed state and the entire first spragging device 238 contacts the inboard face 252.

A second spragging device 232 substantially identical to the inboard spragging device 32, but located on the outboard side, contacts the outboard face 254 of the bushing element 250. A fixed sleeve 234 and a biasing spring 236 disposed between the fixed sleeve 234 and the second spragging device 232 are also located on the outboard side.

Figure 8:
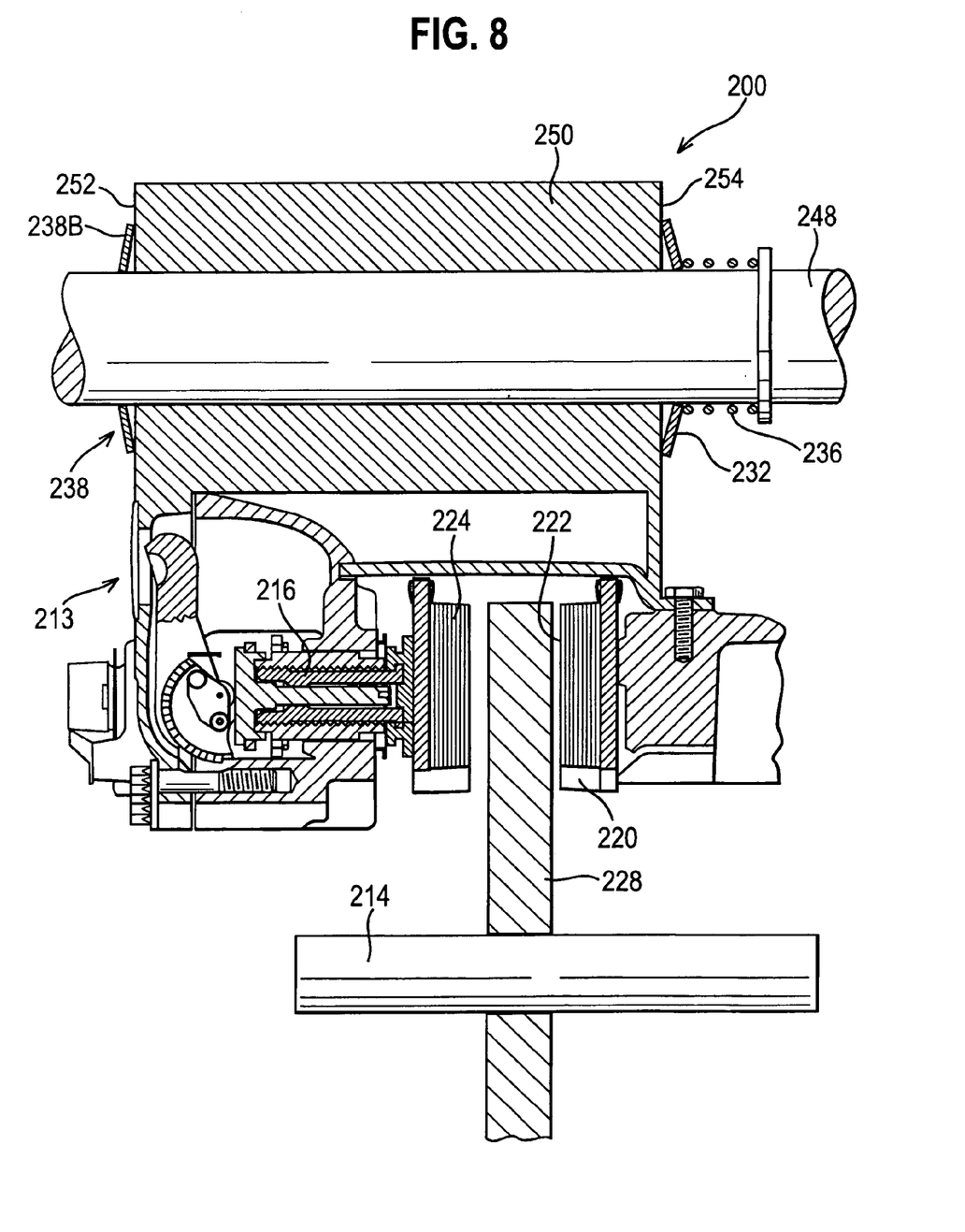
FIG. 8 is a schematic view of the fixed brake disc system of FIG. 7 shown in a brake off position.

When the brake force is released, the first spragging device 238 uncompresses and inclines at an angle α relative to the pin 248, forcing the bushing element 250 and the connected slidable caliper 213 in the outboard direction. As shown in FIG. 8, a running clearance RC is therefore created between the brake disc 228 and a surface 222 of the fixed brake pad 220, the running clearance RC being equal to the distance between the inner rim 238A and the outer rim 238B of the first spragging device 238 when inclined at the angle α.

The force needed to compress the biasing spring 236 is less than the force needed to compress the first spragging device 238, and the biasing spring 236 is compressed by the movement of the slidable caliper 213.

In the brake off position shown in FIG. 8, the first spragging device 238 and the second spragging device 232 restrain movement of the slidable caliper 213 relative to the brake disc 228 is the same manner as the spragging devices 32 and 38 of the brake disc system 110 restrain movement of the brake disc 128 with respect of the shaft 114 and also provides similar benefits.

Instead of the spragging devices 232 and 238, the brake disc system 210 could include a positioning device and moveable sleeve equivalent to the brake disc system 110, but disposed on the pin 248.

Figure 9:
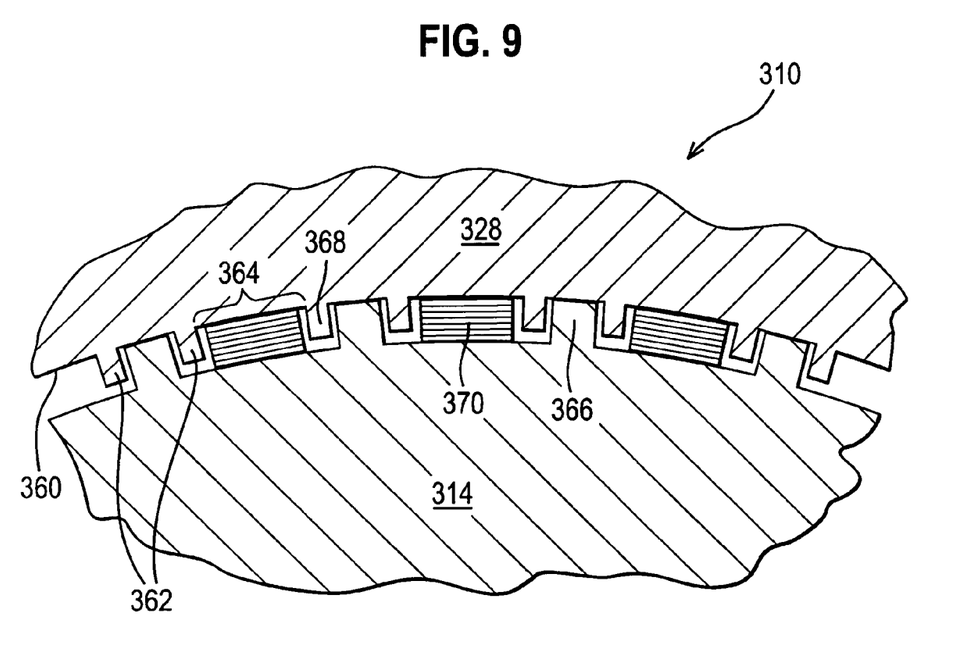
FIG. 9 is a schematic cross sectional view of an interface between a brake disc and a shaft of a fourth embodiment of a brake disc system in accordance with the invention.

A cross sectional view of part of a fourth embodiment of a brake disc system 310 according to the invention is shown in FIG. 9. FIG. 9 illustrates the cross section of the interface between a moveable brake disc 328 and a shaft 314. Substantially identical components with substantially the same function as components in the brake disc system 10 are given the same reference number, but with a prefix of 3.

The moveable brake disc 328 has an inner surface 360 including a series of pairs of splines 362 located around a circumference. A gap 364 between each pair of splines 362 is larger than a gap between each of the splines 362 that make up each pair.

The shaft 314 has an outer surface including a series of shaft splines 366 that each cooperate with a corresponding pair of splines 362 on the brake disc 328. Complaint members 370 are located in the gaps 364 between the pairs of splines 362. The compliant members 370 are wedged between the brake disc 328 and the shaft 314, reducing any rotational movement between the brake disc 328 and the shaft 314.

Figure 10:
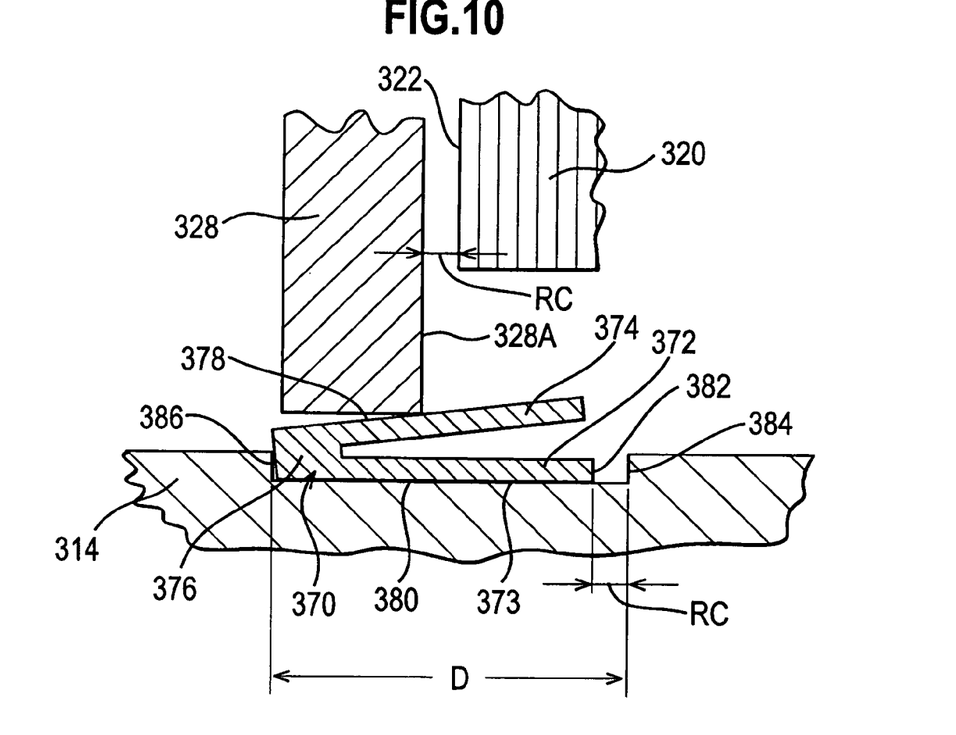
FIG. 10 is a schematic side view of the interface between the shaft and the brake disc of the system of FIG. 9.

FIG. 10 shows a side cross sectional view of the brake disc 328 and the compliant member 370 in positions where little or no pad wear has occurred.

The complaint member 370 has a lower arm 372 and an upper arm 374 connected by a hinge 376. The two arms 372 and 374 are resiliently biased apart and have been partly compressed together to be inserted between the brake disc 328 and the shaft 314. Consequently, each complaint member 370 exerts a radial force on the brake disc 328.

A groove 380 extends axially a distance D along the shaft 314 and is delimited by the abutments 384 and 386. Each complaint member 370 is located within the groove 380 and the extent of possible axial movement relative to the shaft 314 is limited by the extent of the groove 380.

The brake disc 328 is engaged with the compliant member 370 by its resilient nature and also by the large friction force of the upper surface 378 of the upper arm 374.

In the configuration depicted in FIG. 10, a first face 328A of the brake disc 328 is separated from a first surface 322 of the outboard fixed brake pad 320 by a running clearance RC. As shown, the, running clearance RC is identical to the difference between the length of the compliant member 370 and the length D of the groove 380.

When the brake is applied, the brake disc 328 is slid in the outboard direction until the first face 328A contacts the first surface 322. The upper surface 378 of the upper arm 374 has a large coefficient of friction, while the lower surface 373 of the lower arm 372, which is in contact with shaft 314, has a significantly smaller coefficient of friction (alternatively, the surface of groove 380 can have a smaller coefficient of friction than the inner surface 360). Consequently, each compliant member 370 remains fast with the brake disc 328 as it moves into contact with the first surface 322, while each compliant member 370 is more easily slid along the shaft 314 in the outboard direction. In the brake position with the brake disc 328 clamped, the outboard end face 382 of the lower arm 372 contacts the abutment 384 marking the end of the groove 380.

When the brake is released, the brake disc 328 and each compliant member 370 are returned to the positions shown in FIG. 10. The running clearance RC is prevented from increasing beyond its desired amount by the abutment 386 which abuts the hinge 376 in the desired position. Movement of the brake disc 328 with respect to the shaft 314 while in the brake off position is mitigated by the resilience of the complaint member 370 and the frictional forces between the surfaces 373 and 378 with the shaft 314 and the brake disc 328, respectively.

On release of the brake, the running clearance RC can be restored either through disc run out, through vibrations in a conventional manner, or by positive action using means, such as the spragging devices and springs depicted in FIGS. 1 to 8. Such positive restoring means could be in contact with the brake disc 328 or with the compliant member 370. For example, a resilient member could be located in the groove 380 between the end face 382 and the abutment 384. In that example, the groove 380 will be slightly longer such that a total distance D of the groove 380 will be equal to the length of the complaint member 370, the running clearance RC, and the length of the resilient member in its most compressed state.

The fixed brake pad 320 will wear over time, and therefore the first surface 322 will withdraw in the outboard direction. When the fixed brake pad 320 is worn and the brake is applied, the complaint member 370 will impact the abutment 384 before the first face 328A contacts the first surface 322 of the fixed brake pad 320. However, the brake force is large enough to overcome the friction of the upper surface 378, and consequently the brake disc 328 will move axially along the upper surface 378 until it contacts the fixed brake pad 320.

When the brake force is released, the positive restoring means, disc run out or vibrations will move the complaint member 370, which is frictionally fast with the brake disc 328, in the inboard direction until the hinge 376 contacts the abutment 386.

Figure 11:
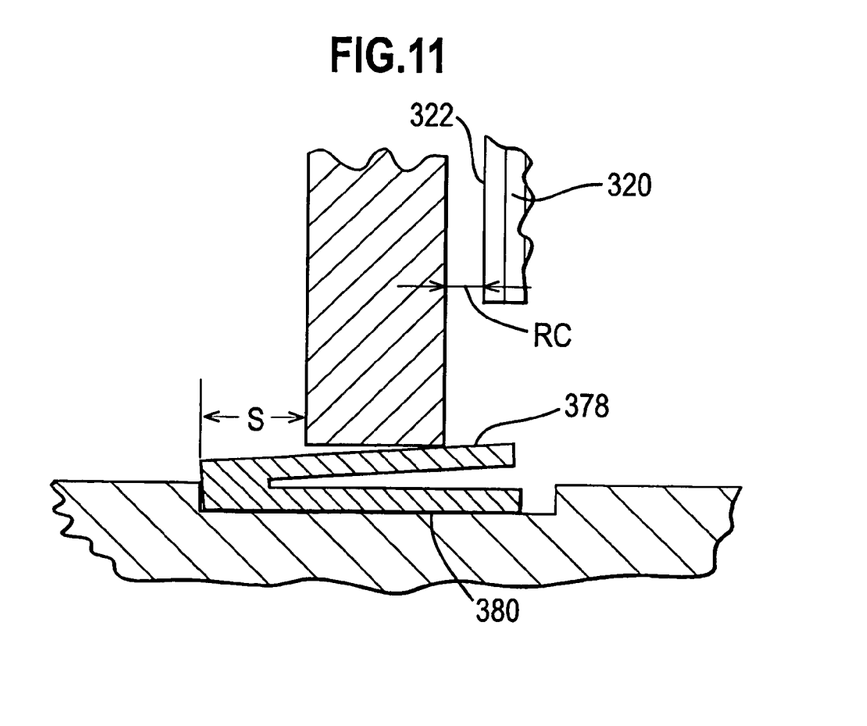
FIG. 11 is a schematic side view of the interface of the brake disc and the shaft of FIGS. 9 and 10, but depicted after significant pad wear of an outward fixed pad.

The position of the brake disc 328 relative to the complaint member 370 after release of the brake and after significant pad wear is shown in FIG. 11. The brake disc 328 is located a distance S inboard from the hinge 376 equivalent to the amount the fixed brake pad 320 has worn, and the running clearance RC is substantially identical to the running clearance RC in FIG. 10.

Figure 12:
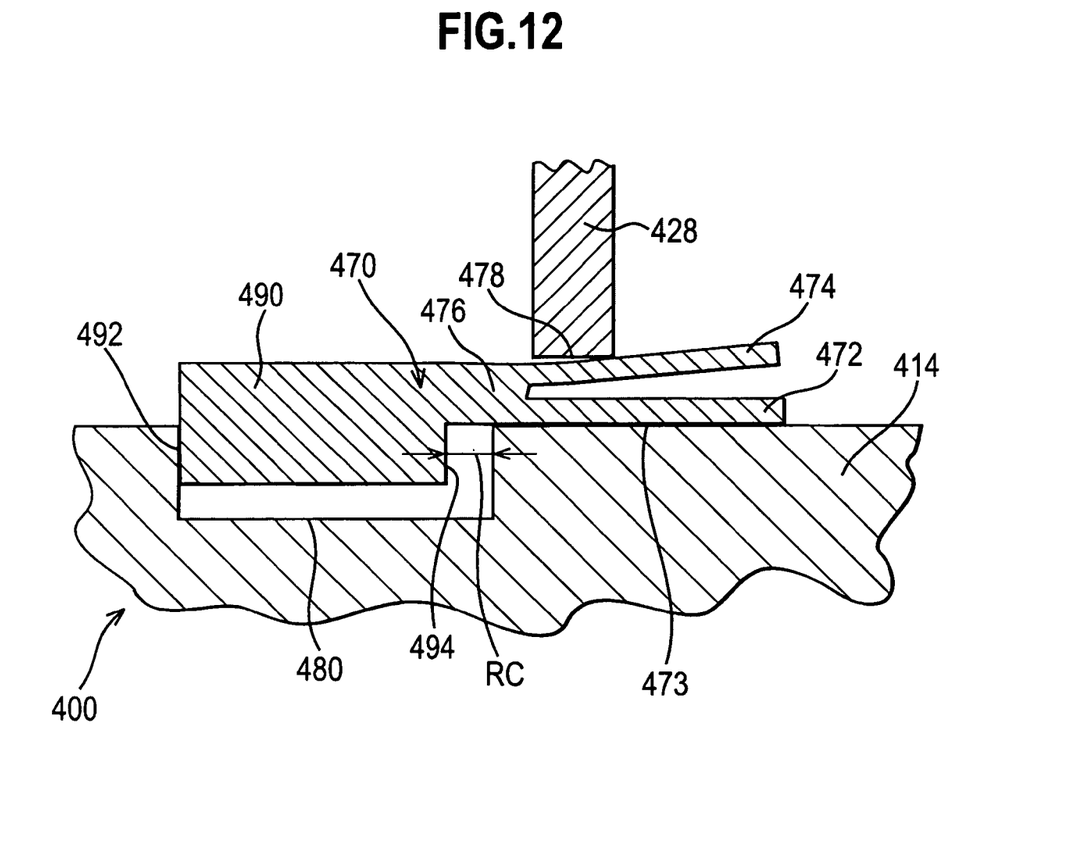
FIG. 12 is a schematic side view of the interface between a shaft and a brake disc of a fifth embodiment of brake disc system in accordance with the invention.

FIG. 12 shows the interface between a brake disc 428 and a shaft 414 of a fifth embodiment of a brake disc system 400. Substantially identical components substantially the same function as components in the brake disc system 310 are given the same reference number, but with a prefix of 4 instead of 3.

A compliant member 470 has a lower arm 472 and an upper arm 474 connected by a hinge 476 and a connecting portion 490. The two arms 472 and 474 are resiliently biased apart and have been partly compressed together to be inserted between the brake disc 428 and the shaft 414. Consequently, the complaint member 470 exerts a radial force on the brake disc 428.

The arms 472 and 474 of each compliant member 470 are located in similar or identical positions to the compliant members 370 and therefore the view shown in FIG. 9 applies to the brake disc system 400 also. A connecting portion 490 is substantially cylindrical and has a plurality of compliant members 470 attached at one end. As such, the plurality of compliant members 470 and the connecting portion 490 form a single easily handleable component. The connecting portion 490 includes a longitudinal slit to allow the connecting portion 490 to be temporarily stretched to a larger diameter in order to be assembled over splines 462. In this case, the connecting portion is made of a resilient material, causing the portion to spring back to its normal smaller diameter once in place for use.

In an alternative construction, the connecting portion 490 includes two separate arcuate portions, each of typically 180 degrees. A plurality of compliant members 470 are connected to each arcuate connecting portion 490. Such an arrangement provides two easily handleable components that can be individually assembled onto the shaft 414.

Thus, the connecting portion or portions 490 allow multiple compliant members 470 to be located simultaneously. Additionally, the connecting portion 490 is located in a groove 480 rather than the arm 472. The connecting portion 490 have abutments 492 and 494 that abut the ends of the groove 480, and the difference between to the length of the groove 480 and the distance between abutments 492 and 494 is substantially identical to the running clearance RC. Consequently, the brake disc system 400 once in place works in a similar manner to the brake disc system 310.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A brake system comprising:
a brake disc including a first disc face and a second disc face on a first side and a second side, respectively, of the brake disc, and the brake disc is mounted to be rotatably fixed with and longitudinally slidable on a rotatable shaft, wherein the brake disc is clampable between a first friction surface of a fixed brake pad positioned on the first side of the brake disc and a second friction surface of a moveable brake pad positioned on the second side of the brake disc;
a disc positioner operable to define a running clearance between the first disc face and the first friction surface, wherein the disc positioner is adjustable to maintain the running clearance as the fixed brake pad wears;
a biasing member located on the second side of the brake disc, wherein the biasing member biases the first disc face of the brake disc towards the disc positioner to maintain contact between the disc positioner and the first disc face of the brake disc; and
a resilient element located on the second side of the brake disc and contacting the second disc face of the brake disc, the resilient element restraining axial movement of the brake disc towards the second friction surface of the moveable brake pad.

2. The brake system according to claim 1 wherein the resilient element includes a sprag surrounding the rotatable shaft that is resiliently biased against the second disc face of the brake disc, wherein the sprag is inclined at an angle relative to the second disc face.

3. A brake system comprising:

a brake disc including a first disc face and a second disc face on a first side and a second side, respectively, of the brake disc, and the brake disc is mounted to be rotatably fixed with and longitudinally slidable on a rotatable shaft, wherein the brake disc is clampable between a first friction surface of a fixed brake pad positioned on the first side and a second friction surface of a moveable brake pad positioned on the second side;

a disc positioner operable to define a running clearance between the first disc face and the first friction surface, wherein the disc positioner is adjustable to maintain the running clearance as the fixed brake pad wears, wherein the disc positioner includes a first sprag surrounding the rotatable shaft that is resiliently biased against and contacting the first disc face of the brake disc, and the first sprag is inclined at an angle relative to the first disc face while a brake is not applied and compresses to a position substantially aligned with the first disc face and the first friction surface when the brake is applied; and a resilient element located on the second side of the brake disc and in contact with the second disc face of the brake disc, the resilient element restraining axial movement of the brake disc towards the second friction surface of the moveable brake pad.

4. The brake system according to claim 3 wherein the resilient element includes a second sprag surrounding the rotatable shaft that is resiliently biased against the second disc face of the brake disc, and the second sprag is inclined at an angle relative to the second disc face.

* * * * *